United States Patent
Baca

(10) Patent No.: US 9,477,577 B2
(45) Date of Patent: Oct. 25, 2016

(54) METHOD AND APPARATUS FOR ENABLING AN EXECUTED CONTROL FLOW PATH THROUGH COMPUTER PROGRAM CODE TO BE DETERMINED

(75) Inventor: David Baca, Roznov Pod Radhostem (CZ)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/233,401

(22) PCT Filed: Jul. 20, 2011

(86) PCT No.: PCT/IB2011/053241
§ 371 (c)(1),
(2), (4) Date: Jan. 17, 2014

(87) PCT Pub. No.: WO2013/011356
PCT Pub. Date: Jan. 24, 2013

(65) Prior Publication Data
US 2014/0157240 A1    Jun. 5, 2014

(51) Int. Cl.
G06F 9/44 (2006.01)
G06F 9/45 (2006.01)
G06F 11/36 (2006.01)
G06F 11/34 (2006.01)

(52) U.S. Cl.
CPC ....... G06F 11/3624 (2013.01); G06F 11/3466 (2013.01); G06F 11/3612 (2013.01); G06F 11/3636 (2013.01); G06F 2201/865 (2013.01); G06F 2201/88 (2013.01)

(58) Field of Classification Search
CPC .... G06F 9/45525; G06F 8/443; G06F 8/441; G06F 11/3471; G06F 11/3676; G06F 11/3644; G06F 11/3636; G06F 11/3696; G06F 11/3612; G06F 11/3466; G06F 11/3624; G06F 8/30; G06F 8/10; G06F 9/44589
See application file for complete search history.

(56) References Cited

U.S. PATENT DOCUMENTS

| | | | |
|---|---|---|---|
| 5,790,858 A | 8/1998 | Vogel | |
| 6,327,699 B1 * | 12/2001 | Larus | G06F 11/3612 714/E11.209 |
| 6,381,739 B1 * | 4/2002 | Breternitz, Jr. | G06F 11/3612 714/37 |
| 6,438,573 B1 * | 8/2002 | Nilsen | G06F 8/10 718/100 |
| 6,668,372 B1 | 12/2003 | Wu | |
| 6,848,100 B1 * | 1/2005 | Wu | G06F 11/3612 714/E11.209 |
| 7,185,328 B2 * | 2/2007 | Grover | G06F 8/443 717/156 |
| 7,409,677 B1 * | 8/2008 | Leventhal | G06F 8/30 717/128 |

(Continued)

OTHER PUBLICATIONS

William Y. Chen et al. ("Profile-Assisted Instruction Scheduling"), 1994, [Retrieved on Jan. 23, 2015]. Retrieved from the internet: <URL: http://citeseerx.ist.psu.edu/viewdoc/summary?doi=10.1.1.154.3951> 34 Pages (1-34).*

(Continued)

Primary Examiner — Thuy Dao
Assistant Examiner — Anibal Rivera

(57) ABSTRACT

A method of enabling an executed control flow path through computer program code to be determined. The method comprising modelling cumulative instruction counts for control flow paths through the computer program code, and inserting at least one probe within the computer program code to enable a cumulative instruction count value for at least one control flow path of the computer program code to be accessed.

20 Claims, 9 Drawing Sheets

(56) References Cited

U.S. PATENT DOCUMENTS

| | | | | |
|---|---|---|---|---|
| 8,291,399 | B2* | 10/2012 | Li | G06F 11/3644 717/126 |
| 8,752,007 | B2* | 6/2014 | Li | G06F 11/3624 717/106 |
| 2002/0173915 | A1 | 11/2002 | Egermann et al. | |
| 2004/0199904 | A1* | 10/2004 | Schmidt | G06F 8/443 717/130 |
| 2004/0261067 | A1* | 12/2004 | Komatsu | G06F 8/443 717/158 |
| 2005/0044538 | A1* | 2/2005 | Mantripragada | G06F 8/443 717/151 |
| 2005/0229165 | A1* | 10/2005 | Ma | G06F 11/3676 717/130 |
| 2005/0251790 | A1* | 11/2005 | Hundt | G06F 11/3466 717/130 |
| 2006/0004813 | A1 | 1/2006 | Desbiens | |
| 2006/0070048 | A1* | 3/2006 | Li | G06F 11/3676 717/144 |
| 2007/0074189 | A1* | 3/2007 | Srinivas | G06F 11/3612 717/144 |
| 2007/0157186 | A1* | 7/2007 | Cheng | G06F 17/5045 717/151 |
| 2008/0052692 | A1* | 2/2008 | Chockler | G06F 9/44589 717/151 |
| 2008/0222614 | A1* | 9/2008 | Chilimbi | G06F 11/3471 717/130 |
| 2009/0018804 | A1 | 1/2009 | Senyard et al. | |
| 2009/0249305 | A1* | 10/2009 | Li | G06F 11/3676 717/130 |
| 2009/0249308 | A1* | 10/2009 | Li | G06F 11/3676 717/132 |
| 2009/0249309 | A1* | 10/2009 | Li | G06F 11/3676 717/132 |
| 2009/0287965 | A1* | 11/2009 | Oishi | G06F 17/5022 714/45 |
| 2010/0286969 | A1 | 11/2010 | Selvaraj et al. | |
| 2010/0287536 | A1* | 11/2010 | Chung | G06F 8/443 717/128 |
| 2014/0049549 | A1* | 2/2014 | Lukyanov | G06T 1/60 345/522 |

OTHER PUBLICATIONS

Robert L. Probert ("Optimal Insertion of Software Probes in Well-Delimited Programs", IEEE, vol. SE-8, No. 1, Jan. 1982, [Retrieved on Jan. 23, 2015]. Retrieved from the internet: <URL: http://www.ieeexplore.ieee.org/stamp/stamp.jsp?tp=&arnumber=1702903> 9 Pages (34-42).*

F. Corno et al., Exploiting Auto-adaptive uGP for Highly Effective Test Programs Generation, 2003, [Retrieved on Jul. 8, 2016]. Retrieved from the internet: <URL: http://download.springer.com/static/pdf/961/chp%253A10.1007%252F3-540-36553-2_24.pdf?> 12 Pages (262-273).*

Richard Sharp, Higher-Level Hardware Synthesis, Nov. 2002, [Retrieved on Jul. 8, 2016]. Retrieved from the internet: <URL: http://citeseerx.ist.psu.edu/viewdoc/download?doi=10.1.1.12.3825&rep=rep1&type=pdf> 213 Pages (1-213).*

International Search Report and Written Opinion correlating to PCT/IB2011/053241 dated Apr. 2012.

T. Ball et al: "Optimally Profiling and Tracing Programs", Appears in ACM Transactions on Programming Languages and Systems, 16(3):1319-1360, Jul. 1994.

T. Ball et al: "Optimally Profiling and Tracing Programs", An abridged version of this paper will appear in the 19th Symposium on Principles of Programming Languages (Jan. 19-22, 1992), Technical Report #1031, Revision 1, Sep. 6, 1991.

De Knuth et al: "Optimal Measurement Points for Program Frequency Counts", BIT, 13(3):313-322, 1973.

H. Agrawal: "Dominators, Super Blocks, and Program Coverage", Proceeding POPL '94 Proceedings of the 21st ACM SIGPLAN-SIGACT symposium on Principles of programming languages, Portland, OR, pp. 25-34, 1994.

T. Ball et al: "Efficient Path Profiling", Published in Proceedings of MICRO-29, Dec. 2-4, 1996, in Paris, France, pp. 1-12, 1996.

J.R. Larus: "Efficient Program Tracing", IEEE Computer Society, vol. 26, Issue 5, pp. 52-61, May, 1993.

* cited by examiner

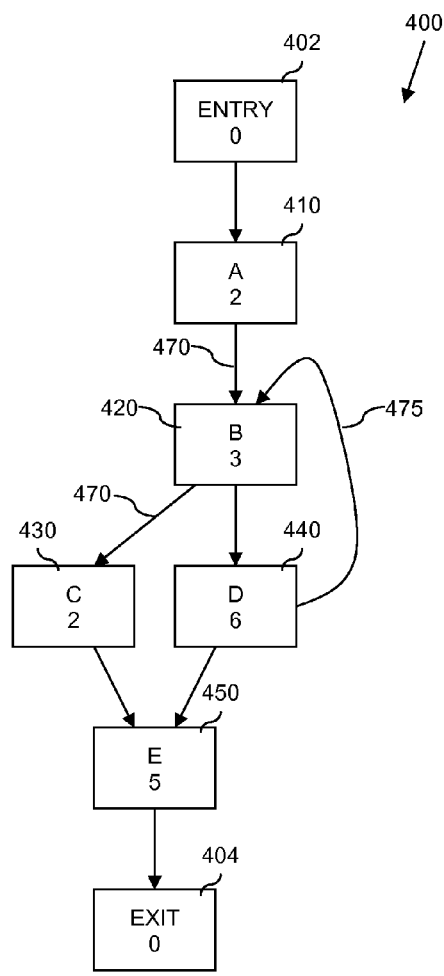
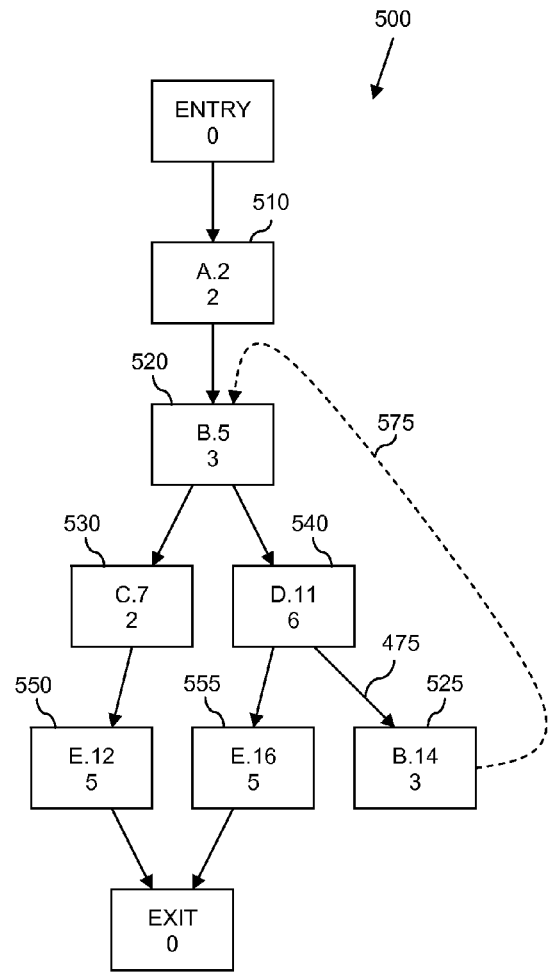
FIG. 4          FIG. 5

METHOD AND APPARATUS FOR ENABLING AN EXECUTED CONTROL FLOW PATH THROUGH COMPUTER PROGRAM CODE TO BE DETERMINED

FIELD OF THE INVENTION

The field of this invention relates to a method and apparatus for enabling an executed control flow path through computer program code to be determined.

BACKGROUND OF THE INVENTION

Some integrated circuits enable the rapid execution of software applications. During software development, it is sometimes necessary to analyze how well various parts of the software are functioning. This analysis may lead on to 'de-bugging' of the software as well as software testing. De-bugging involves improving software reliability and software performance. Software testing serves to exercise parts of the software.

Software is usually built up from blocks of linear code. Each block of code consists of a sequence of instructions that can be entered only at the beginning of the code sequence, and exited only at the end of the code sequence. So, once the program code of a block has commenced running, that code will be executed until the end of the block is reached. The program control flow may then select another block for execution.

FIG. 1 shows a control flow graph 100, which is a directed graph that provides a diagrammatic representation of the 'program control flow' of computer program code that makes up the piece of software. A control flow graph comprises an 'ENTRY' point and an 'EXIT' point, and various vertices, each of which represents a block of code within the computer program code. In this description, the terms 'block of code' and 'vertex' may be assumed in various instances to mean the same. The vertices in FIG. 1 are labelled A to F. The control flow graph also shows 'edges', which are the directed arrows connecting the vertices and which represent the control flow between the blocks of code. The software execution flows along the edges, between blocks.

When a piece of software runs, it is important to gather information about those blocks that are executed. This information may be gathered by 'instrumenting' the source code. The source code of a block may be instrumented by placing a 'probe' into it. A probe is typically a set of instructions whose task is to detect and signal when a particular block runs.

When a probe is encountered, during execution of a block, the probe performs an action or set of actions. These actions may include, for example: incrementing a counter to show how many times the block has been executed; marking a flag; or writing a token to a file. Probes may also, or alternatively, be associated with the edges of the control flow graph.

It is known that the simplest method of finding out when each of the program blocks executes is to place a probe in every software block. The probe detects each time that the respective block is executed, and signals this to a monitoring system. In effect, the program is instrumented with probes that record passes through each part/section of the executed program. However, each time a probe detects and reports that its software block is being executed, a delay is introduced. Furthermore, the more times that probes report their software blocks being executed, the more data is produced, which may be required to be stored, for example within an on-die buffer. Thus, it is desirable to minimize the number of probes invoked during the program execution.

SUMMARY OF THE INVENTION

The present invention provides a method of enabling an executed control flow path through computer program code to be determined, a method of determining control flow during execution of computer program code, an apparatus for instrumenting probes within computer program code, and an integrated circuit device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 4 shows an alternative example of a control flow graph for computer program code.

FIG. 5 shows an alternative example of an expanded control flow graph for computer program code.

DETAILED DESCRIPTION

Figure 1:
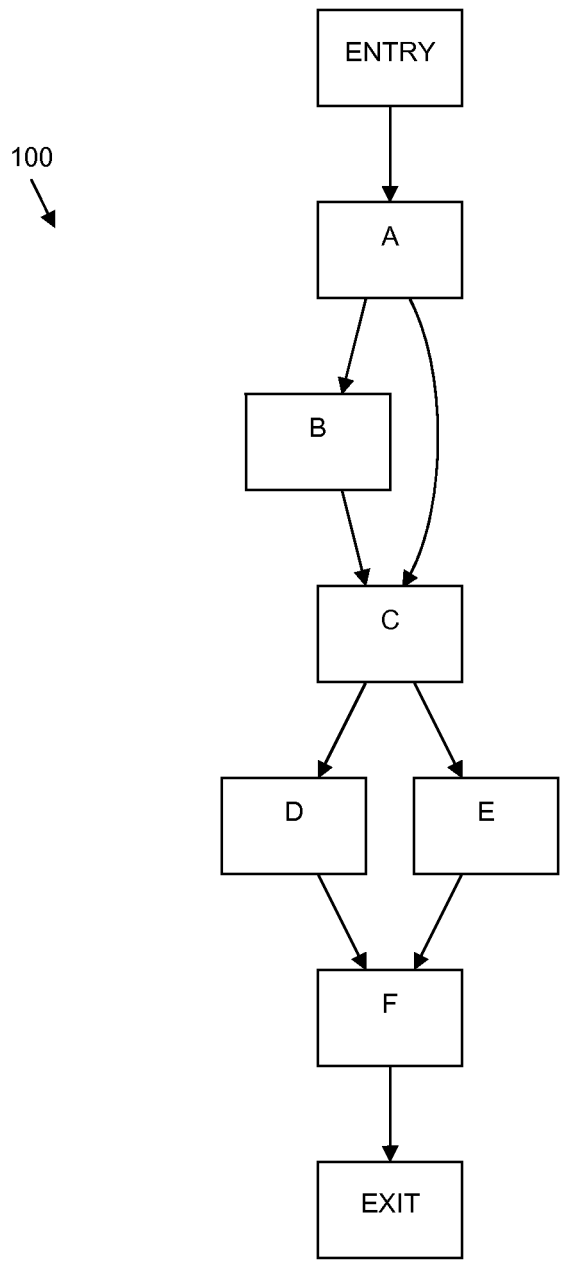
FIG. 1 shows an example of a conventional control flow graph for computer program code.
Figure 2:
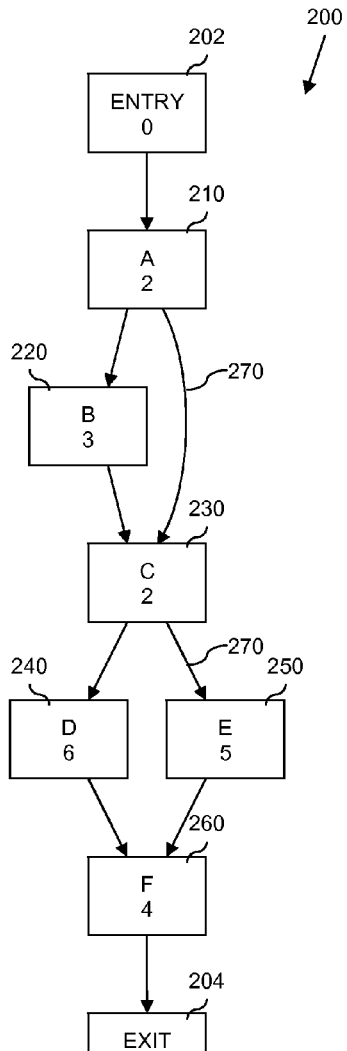
FIG. 2 shows an example of a control flow graph for computer program code.

Referring first to FIG. 2, there is illustrated an example of a control flow graph 200. The control flow graph 200 comprises a directed graph that provides a diagrammatic representation of a 'program control flow' for a piece of computer program code. The control flow graph 200 comprises an ENTRY point 202 of the computer program code, and an EXIT point 204 of the computer program code. The control flow graph 200 further comprises vertices 'A'-'F' 210 to 260, each of which represents a block of linear code. Each block of linear code consists of a sequence of instructions that can be entered only at the beginning, and exited only at the end. So, once the program code of a block has begun running, that code will be executed until the end of the block is reached. The vertices 210 to 260 in FIG. 2 are labelled A to F. The control flow graph 200 also shows 'edges' 270, which are the directed arrows connecting the vertices 210 to 260, and which represent possible control flow between the blocks of code.

Each block of code, represented within the control flow graph 200 as a vertex 210 to 260, comprises a certain number of instructions to be executed, the various blocks of code/vertices 210 to 260 typically comprising different numbers of instructions. For example, the number of instructions within each block of code is identified in FIG. 2 within the respective vertex as a numerical value below the vertex label. Thus, the block of code represented by vertex A 210 comprises two instructions to be executed; the block of code represented by vertex B 220 comprises three instructions to be executed; etc.

As can be seen, different paths through the control flow graph 200 from the ENTRY point 202 to the EXIT point 204 will require different numbers of instructions to be executed. Thus, it has been recognised by the inventor that the control flow during execution of the computer program code represented by the control flow graph 200 may be at least partly determined based on an instruction count for the execution of the computer program code. In particular, in a simple case where each individual control flow path through the control flow graph 210 to 260 comprises a different number of instructions to be executed, the specific control flow during execution of the computer program code represented thereby may be determined solely by an indication of the instruction count following execution. In some examples, this may be achieved by way of a single probe being instrumented within, for the illustrated example, the block of code represented by the last vertex F 260 of the control flow graph 200, with said probe enabling an instruction counter to be accessed, such as is typically provided within modern instruction processing modules. Thus, the control flow during execution of the computer program code may be determined by using just a single probe (at least for the simplified illustrated example), thereby minimizing the potentially adverse effects on the execution of the computer program code caused by the inclusion of probes therein.

Thus, and in accordance with some example embodiments of the present invention, there is provided a method of enabling an executed control flow path through computer program code to be determined. The method comprises modelling cumulative instruction counts for control flow paths through the computer program code, and instrumenting at least one probe within the computer program code to access a cumulative instruction count value for at least one control flow path of the computer program code. In this manner, and as identified above, the specific control flow during execution of the computer program code may be determined based on the instruction count value accessed by the probe.

For the conventional control flow graph 200 illustrated in FIG. 2, each block of code is represented by a single vertex 210 to 260, with control flow there between represented by the edges 270. As each vertex 210 to 260 of FIG. 2 represents all instances of a block of code (i.e. within all control flow paths), irrespective of the path taken to reach that block of code, the conventional control flow graph 200 of FIG. 2 is not optimized for differentiating between different control flow paths through the computer program code, and in particular is not optimized for tracing cumulative instruction counts through the different control flow paths of the computer program code represented thereby.

Figure 3:
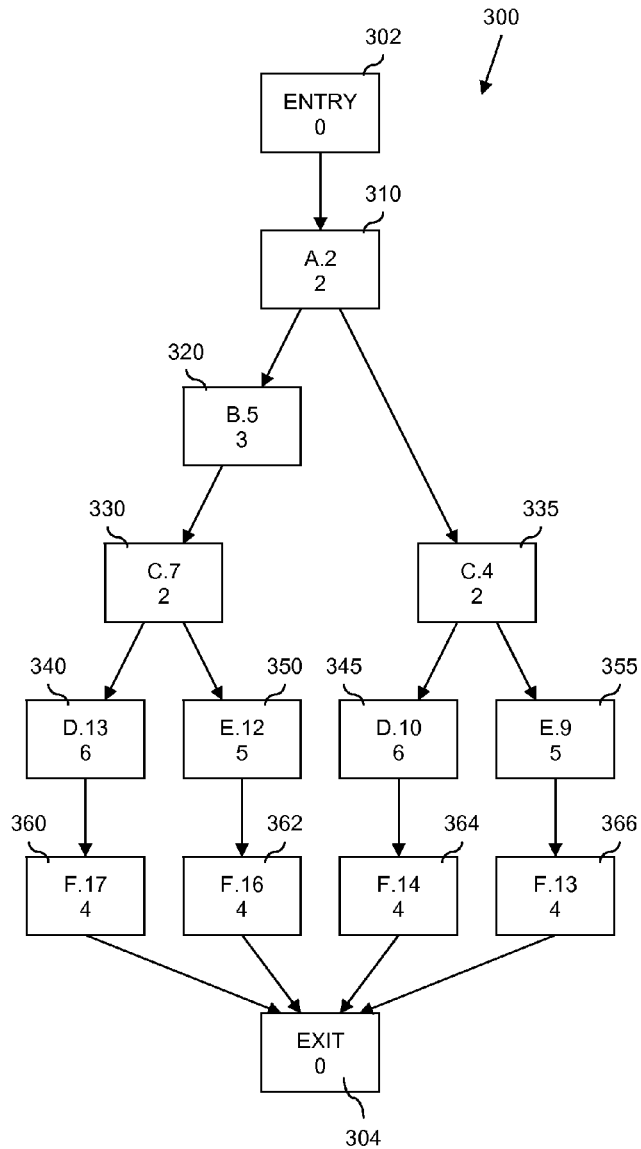
FIG. 3 shows an example of an expanded control flow graph for computer program code.

FIG. 3 illustrates an expanded control flow graph 300, and in particular illustrates an expanded version of the conventional control flow graph 200 of FIG. 2. For the expanded control flow graph 300, the vertices 210-260 of the conventional control flow graph 200 are expanded to provide vertices 310-366 representing individual instances of blocks of code within different control flow paths through the computer program code. A cumulative instruction count value is determined for each of the vertices 310-366 within the expanded control flow graph 300. For the illustrated example, the cumulative instruction count value (cic) for each vertex 310-366 is included within the naming convention: original_name.cic. Thus, for the first vertex A.2 310 in the expanded control flow graph 300, which is derived from the first vertex A 210 in the control flow graph 200 of FIG. 2, a cumulative instruction count value (cic) of '2' is determined, i.e. the sum of instructions within the computer program code up to and including that instance of the block of code.

Thus, in this manner, by representing individual instances of the blocks of code within different control flow paths through the computer program code with separate vertices, and by determining cumulative instruction count values for each vertex 310-366, and thus for each instance of each block of code, the cumulative instruction count values for control flow paths through the computer program code may be modelled to enable efficient instrumenting of probes within the computer program code, and thereby to enable an executed control flow path through the computer program code to be determined.

In particular, by generating such an expanded control flow graph, the cumulative instruction count values for the different possible control flow paths through the computer program code are able to be effectively modelled and analysed in order to enable an optimal (e.g. minimum) set of probes to be instrumented within the computer program code in order to enable control flow there through to be traced. For example, for the expanded control flow graph 300 of FIG. 3, it can clearly be seen that there are four possible control flow paths through the computer program code; each control flow path ending at a unique instance of the block of code F represented by vertices 360, 362, 364, 366.

In addition, the cumulative instruction count values for the control flow paths through the computer program code are defined within the respective vertices 360, 362, 364, 366. As such, an optimal (e.g. minimum) set of probes to be instrumented within the computer program code may be determined based on the cumulative instruction count values for each control flow path. In particular for the illustrated example, it can clearly be seen from the cumulative instruction count values of each instance of the block of code F 360, 362, 364, 366 that the various control flow paths comprise different cumulative instruction count values; specifically the first instance of the block of code F (F.17) 360 comprises a cumulative instruction count value of 17, the second instance of the block of code F (F.16)362 comprises a cumulative instruction count value of 16, the third instance of the block of code F (F.14) 364 comprises a cumulative instruction count value of 14, and the fourth instance of the block of code F (F.13) 366 comprises a cumulative instruction count value of 13.

Thus, the control flow during execution of the computer program code may be determined simply by determining an instruction count following execution. Thus, the control flow through the computer program code represented by the control flow graph 200 and the expanded control flow graph 300 may be traced by inserting a probe within a single block of code, such as within an 'exiting' block of code (e.g. a block of code following which the computer program code returns or exits) represented by vertex F 260 and vertices F.360, F.362, F.364, F.366, respectively, with the probe being arranged to enable an instruction count value for the execution of the computer program code to be accessed. For example, such a probe may simply comprise a breakpoint to enable a debugger or other external hardware device to access an instruction counter. Alternatively, such a probe may cause a processing module executing the computer program code to read and output an instruction count for the execution of the computer program code. In some examples, the instruction count may be output to a memory element for later retrieval or directly to a debugger or other external hardware device.

In some examples, the expanded control flow graph 300 of the illustrated example may represent the control flow for a relatively simple and straightforward computer program, where typical computer programs comprise far more complex control flows comprising many more possible control flow paths. As such, determining an optimal set of probes for enabling the tracing etc. of computer program execution can be a complex process, for which various techniques and methods have been developed. Such known techniques and methods include, by way of example, methods based on Kirchhoff's law such the Knuth-Stevenson program frequency method: D. E. Knuth and F. R. Stevenson, '*Optimal measurement points for counts*', BIT, 13(3): 313-322, 1973, as well as methods based on dominance such as described in: Hiralal Agrawal. '*Dominators, super blocks, and program coverage*', In Conference Record of Principles of Programming Languages—94: 21st ACM SIGPLAN-SIGACT Symposium on Principles of Programming Languages, pages 25-34, Portland, Oreg., 1994. In some examples, such techniques and methods for optimizing the number of probes required to be instrumented within computer program code may be capable of being implemented alongside the proposed architecture and methods.

Known techniques and methods for probe optimization typically utilise conventional control flow graphs. Accordingly, by using an expanded control flow graph, such as illustrated in FIG. 3 to model cumulative instruction counts for control flow paths through the computer program code, the semantics of the corresponding conventional control flow graph are preserved (e.g. the expanded control flow graph contains only the paths within the computer program code that are modelled by the conventional control flow graph). Thus, the use of such an expanded control flow path enables, at least for some example embodiments of the present invention, to be implemented alongside other known techniques and methods for probe optimization that use conventional control flow graphs.

For the examples illustrated in FIGS. 2 and 3, the control flow graphs 200, 300 represent acyclic computer program code, i.e. computer program code comprising no loops or other cyclical characteristics. Accordingly, control flow through the computer program code is substantially linear. Thus, cumulative instruction count values are deterministic and singularly definable for each instance of a block of code. However, computer program code often comprises loops or other cyclical characteristics that may lead to potentially infinite possibilities with regard to control flow paths through the computer program code during execution.

FIG. 4 illustrates a simple example of a control flow graph 400 for computer program code comprising such a loop. In a similar manner to the acyclic control flow graph 200 of FIG. 2, the control flow graph 400 of FIG. 4 comprises an ENTRY point 402 of the computer program code, and an EXIT point 404 of the computer program code. The control flow graph 400 further comprises vertices 410 to 450, each of which represents a block of linear code. The vertices 410 to 450 in FIG. 4 are labelled A to E. The control flow graph 400 also shows 'edges' 470, 475, which are the directed arrows connecting the vertices 410 to 450, and which represent possible control flow between the blocks of code. In particular, for the control flow graph 400 of FIG. 4, the computer program code being represented comprises a loop from the block of code represented by vertex D 440 back to the block of code represented by vertex B 420. This loop is represented in the control flow graph 400 by the edge 475. In some examples, such a loop may introduce a potential for infinite control flow paths through the computer program code, since an executed control flow may potentially involve any number of loop iterations. Thus, in order to model cumulative instruction counts for control flow paths through computer program code, any loops or other cyclic characteristics within the computer program code must be taken into consideration.

FIG. 5 illustrates an expanded control flow graph 500 corresponding to the conventional control flow graph 400 of FIG. 4. For the expanded control flow graph 500, the vertices 410 to 450 of the conventional control flow graph 400 are expanded to provide vertices 510 to 555 representing individual instances of blocks of code within different control flow paths through the computer program code. A cumulative instruction count value is determined for each of the vertices 510 to 555 within the expanded control flow graph 500 in order to enable the cumulative instruction counts for control flow paths through the computer program code to be modelled. As for the example illustrated in FIG. 3, the cumulative instruction count value (cic) for each vertex 510 to 555 is included within the naming convention: original_name.cic. Thus, for the first vertex A.2 510 in the expanded control flow graph 500, which is derived from the first vertex A 410 in the control flow graph 400 of FIG. 4, a cumulative instruction count value (cic) of '2' is determined, i.e. a sum of instructions within the computer program code up to and including that instance of the block of code.

As identified above, the computer program code represented by the conventional control flow graph 400, and thus also by the expanded control flow graph 500, comprises a loop. This loop is represented in the conventional control flow graph 400 by the edge 475, which provides for a control flow from the block of code represented by vertex D 440 back to the block of code represented by vertex B 420. For the expanded control flow graph 500, a cumulative instruction count value is determined for each of the vertices 510 to 555 in order to enable the cumulative instruction counts for control flow paths through the computer program code to be modelled.

In order to enable the effect on the instruction count value of the loop represented by the edge 475 within the conventional control flow graph 400 to be modelled, the vertex B 420 of the conventional control flow graph 400 is expanded within the expanded control flow graph 500 to comprise, for the illustrated example, a first, reference vertex B.5 520 representing a first instance of the respective block of code, and a second, return vertex B.14 525 representing a second instance of the respective block of code. Specifically, for the example illustrated in FIG. 5, the loop reference vertex B.5 520 represents a reference instance of the respective block of code, which for the illustrated example comprises the first instance for the block of code within the control flow of the computer program code. This loop reference vertex B.5 520 comprises a cumulative instruction count value representative of a sum of instructions within the computer program code up to and including that instance of the block of code, namely a cumulative instruction count value of five. The second, return vertex B.14 525 represents a return instance of the block of code within the control flow of the computer program code. This return vertex B.14 525 comprises a cumulative instruction count value that is representative of the sum of instructions within the computer program code up to and including that instance of the block of code, namely a cumulative instruction count value of fourteen.

In order for the cumulative instruction count values for vertices within the expanded control flow graph 500 following the loop in the computer program code to remain valid, a regressive edge, illustrated at 575 is provided from the return vertex B.14 525 back to the loop reference vertex B.5 520. This regressive edge represents, in accordance with some example embodiments, resetting the instruction counter back to 5, which is the cic value of the vertex B.5 520. This requires a probe to be allocated to the vertex B 420 within the conventional control flow graph 400, and by way of instrumenting a probe therein an instruction count for the execution of the computer program code is decremented, or otherwise reverted back, from a value that is representative of the return instance of the block of code (e.g. fourteen) to a value that is representative of the reference instance of the block of code (e.g. five). In this manner, the instruction count of a looped control flow for the computer program code is bound, thereby enabling the cumulative instruction count values for vertices within the expanded control flow graph 500 following the loop in the computer program code to remain bound. A probe instrumented within the computer program code to bound the instruction count in this manner may be further arranged to log, record frequency, or otherwise enable the tracking of, each instance of the respective loop.

Thus, the control flow through the computer program code that is represented by the expanded control flow graph 500 may be traced by instrumenting just two vertices: a first probe inserted within the block of code represented by vertex E 450, 550, 555, this first probe being arranged to enable an instruction count value for the execution of the computer program code to be accessed; and a second probe inserted within the block of code represented by vertex, B 420, 520, 525, this second probe being arranged to enable an instruction count value for the execution of the computer program code to be both accessed and written to in order to enable an instruction count for the execution of the computer program code to be bounded. Both probes may use the cumulative instruction count to record frequencies, vertex labels or other statistical data.

Each loop in a control flow graph may have at least one vertex with a probe allocated to it in order to keep the cic number bound. Such a probe may record repetitive execution of the loop and also modify the instruction counter to keep the cic number bound. For a control flow graph, a set of vertices for which every loop contains at least one vertex from the set is called Loop Hitting Set (LHS). A loop hitting vertex is a vertex from the LHS. A regression vertex is a vertex in an expanded control flow graph the origin of which belongs to the LHS. It is desirable in order to limit the number of probes to find such an LHS that is minimal; however, this is an intractable problem, and any LHS is sufficient for keeping the instruction count bound. For FIG. 4 and FIG. 5, the LHS comprises vertex B 420, 520, 525 only.

Figure 6:
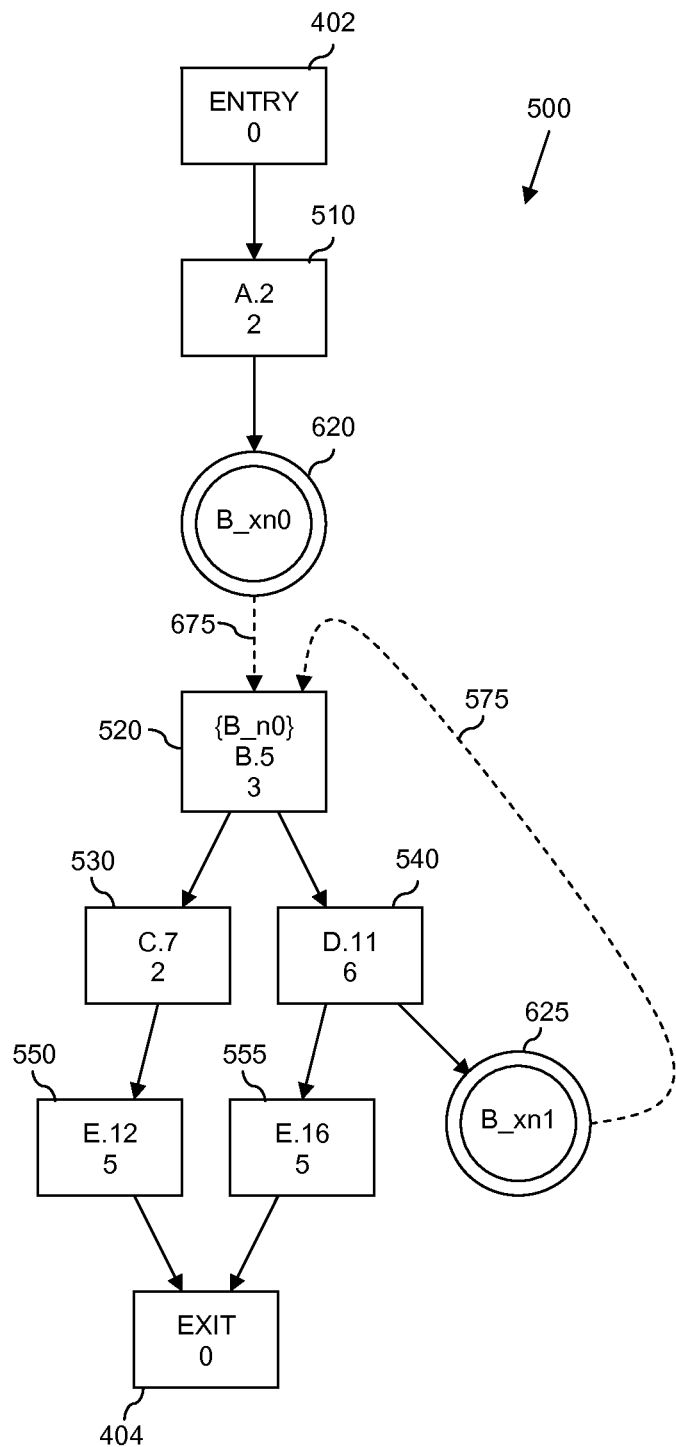
FIG. 6 shows an example of an algorithmic implementation of the expansion of a loop hitting vertex.

FIG. 6 illustrates an example of an algorithmic implementation of the expansion of the loop hitting vertex B 420 of the conventional control flow graph 400. For the simplified example illustrated in FIG. 4, the computer program code comprises only a single control flow path that is initially leading from the ENTRY 402 to the loop hitting vertex B 420. However, in practice, for each loop hitting vertex within a conventional control flow graph, there may be any number of control flow paths initially leading to the loop hitting vertex from an entry point of the control flow graph, each such control flow path potentially comprising a different cumulative instruction count value. Accordingly, and as illustrated in FIG. 6, the loop hitting vertex B 420 of FIG. 4 may be expanded to several regression B.x vertices, illustrated generally by multi-vertex B_xn0 620; for each B.x vertex there is a control flow path leading from the ENTRY 402 to an initial instance of the loop hitting vertex B 420. A loop reference vertex B_n0 520 (labelled B.5 in FIG. 5) is then created for the loop hitting vertex B 420. As described above, this loop reference vertex B_n0 520 is assigned a cumulative instruction count value that is representative of the sum of instructions within the computer program code up to and including that instance of the block of code, namely a cumulative instruction count value of five for the example illustrated in FIG. 5. More specifically, in order to accurately represent all control flow paths leading to the loop hitting vertex B 420 from the ENTRY 402, the loop reference vertex B_n0 520 is assigned a cumulative instruction count value that is greater than or equal to each of the cumulative instruction count values of the set of regression vertices B_xn0 620. So, for example, the loop reference vertex B_n0 520 may be assigned a cumulative instruction count value that is equal to the largest of the cumulative instruction count values of the set of regression vertices 620, which for the simplified illustrated example is five. A forward regressive edge, illustrated at 675, is created from each of the regression vertices B_xn0 620 to the loop reference vertex B_n0 520. Each of these forward regressive edges 675 represents, in accordance with some example embodiments, setting the instruction counter to the cic value of B_n0. In this manner, an instruction count for the execution of the computer program code may be incremented, or otherwise modified, where necessary to a value representative of the cumulative instruction count value assigned to the loop reference vertex B_n0 520 (e.g. five for the illustrated example). A probe or the like instrumented within the computer program code to modify the instruction count in this manner may be further arranged to log, or otherwise enable the tracking of, any such modification to the instruction count to enable the control flow path up to that point to be determined. In some examples, since the simplified example illustrated in FIGS. 4 and 5 comprises only a single control flow path between the ENTRY 402 and the loop hitting vertex B 420, a forward regression vertex was not illustrated in FIG. 5 to simplify the initial explanation of the expanding of the control flow graph.

The loop hitting vertex B 420 of FIG. 4 may be further expanded to comprise a set of return vertices B_xn1, illustrated generally at 625, for each control flow path looping back to the loop hitting vertex B 420 of FIG. 4. Thus, for the illustrated example, since only a single control flow path loops back to the loop hitting vertex 420 of FIG. 4, B_xn1 625 contains only a single vertex. The set of return vertices 625 represents return instances of the block of code within the control flow of the computer program code. Each vertex in the set of return vertices 625 comprises a cumulative instruction count value that is representative of the cumulative instruction count up to and including that instance of the block of code, which for the illustrated example comprises a cumulative instruction count value of fourteen, as illustrated in FIG. 5. In order for the cumulative instruction count values for vertices within the expanded control flow graph 500 following the loop in the computer program code to remain bound, a regressive edge, illustrated at 575 is provided from each return vertex in B_xn1 625 back to the loop reference vertex B_n0 520. Note that 575 represents a set of regressive edges. As previously described, such a regressive edge in 575 represents, in accordance with some example embodiments, resetting the instruction counter back to the cic value of B_n0. In this manner, an instruction count for the execution of the computer program code may be decremented, or otherwise reverted back, from a value that is representative of the return instance of the block of code (e.g. fourteen) to a value that is representative of the reference instance of the block of code (e.g. five).

In this manner, the instruction count of a looped control flow for the computer program code may be bound, thereby enabling the cumulative instruction count values for vertices within the expanded control flow graph 500, 600 following the loop in the computer program code to remain valid. A loop hitting vertex instrumented within the computer program code to bound the instruction count in this manner may be further arranged to log, or otherwise enable the tracking of, each instance of the respective loop.

Figure 7:
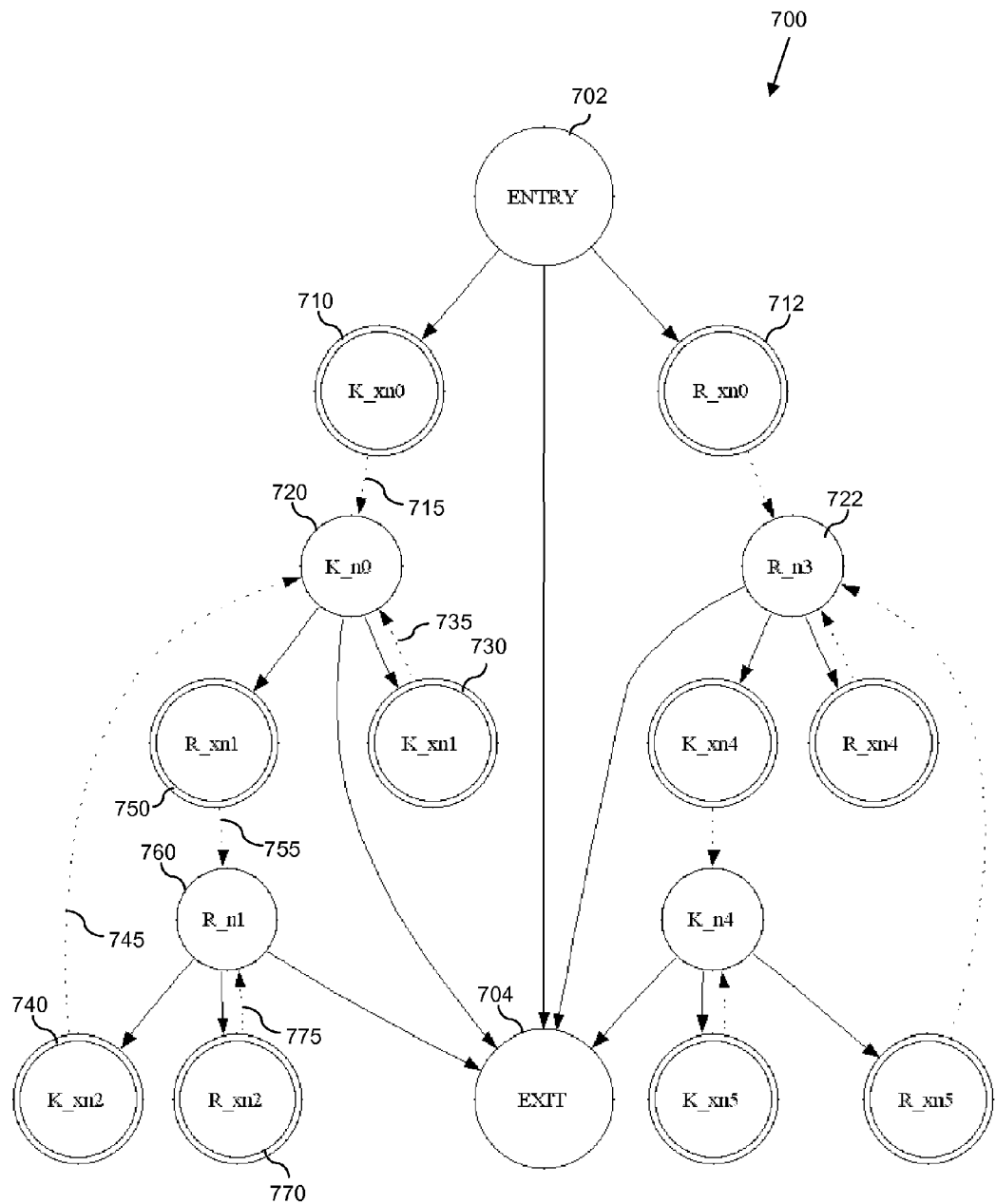
FIG. 7 shows an alternative example of an algorithmic implementation of the expansion of loop hitting vertices.

In some examples, the control flow graphs for the example illustrated in FIGS. 4 to 6 represent a simple example of control flow for computer program code. In particular, the computer program code comprises only a single loop, and only a single control flow path initially leading to the loop reference vertex B.5 520, and only a single control flow path looping back via a single return vertex B.14 525. FIG. 7 illustrates an example of a canonical algorithmic implementation of the expansion for loops within computer program code in order to demonstrate more generally an example of a principle of expanding cyclic control flow graphs. For the example illustrated in FIG. 7, a control flow graph 700 to be expanded comprises an ENTRY 702, and EXIT 704 and two loop hitting vertices, K and R. Thus, the control flow graph 700 comprises a loop hitting set: LHS={K,R}. The loop hitting set (LHS) of a control flow graph comprises all vertices within the conventional control flow graph at which a regressive edge (i.e. a loop) terminates. Accordingly, no control flow path should encounter the same vertex more than once without encountering at least one vertex within the LHS between encounters of that same vertex.

Expansion of the control flow graph 700 may begin at the ENTRY 702, and may be performed in steps, starting with generating a set of regression vertices from the ENTRY 702 for each of the vertices within the loop hitting set, such as illustrated by K_xn0 710 and R_xn0 712. Each set of regression vertices K_xn0 710 and R_xn0 712 represents the various control flow paths from the ENTRY 702 to an initial instance of the respective loop hitting vertex.

Expansion of the control flow path 700 may then continue with the creation of a loop reference vertex K_n0 720 for the loop hitting vertex K. The loop reference vertex K_n0 720 is assigned a cumulative instruction count value that is representative of the cumulative instruction count up to and including that instance of the block of code. More specifically, in order to accurately represent all control flow paths leading to the loop hitting vertex K from the ENTRY 702, the loop reference vertex K_n0 720 is assigned a cumulative instruction count value that is greater than or equal to each of the cumulative instruction count values of the set of regression vertices K_xn0 710 and R_xn0 712. So, for example, the loop reference vertex K_n0 720 may be assigned a cumulative instruction count value equal to the largest of the cumulative instruction count values of the set of regression vertices K_xn0 710 and R_xn0 712.

A forward regressive edge, illustrated at 715, is created from each of the forward regressive vertices within the set of regression vertices K_xn0 710 to the loop reference vertex K_n0 720. Each of these forward regressive edges 715 represents, in accordance with some example embodiments, setting the instruction counter to the cic number assigned to the loop reference vertex K_n0 720. In this manner, an instruction count for the execution of the computer program code may be incremented, or otherwise modified, where necessary to a value that is representative of the cumulative instruction count value assigned to the loop reference vertex K_n0 720.

The expansion of the control flow graph 700 may then continue, as shown. Control flow paths that loop back to the loop hitting vertex K may be logically arranged into sets of control flow paths; a first set of control flow paths comprising 'linear' control flow paths, for example control flow paths that comprise no further loops or the like; and for the illustrated example a further set of control flow paths comprising control flow paths comprising at least one instance of the second loop hitting vertex R. Accordingly, for the illustrated example, the control flow path 700 may be further expanded with the creation of a set of return vertices K_xn1, illustrated generally at 730, for each linear control flow path looping back to the loop hitting vertex K, and a set of regression vertices R_xn1 750 for the loop hitting vertex R for each control flow path comprising at least one instance of the second loop hitting vertex R. Each vertex within the set of return vertices K_xn1 730 comprises a cumulative instruction count value that is representative of the cumulative instruction count up to and including that return instance of the respective block of code. A regressive edge, illustrated at 735 and representing a set of regressive edges, is provided from each return vertex within the set of return vertices K_xn1 730 back to the loop reference vertex K_n0 720. Similarly, each vertex within the set of regression vertices R_xn1 750 comprises a cumulative instruction count value that is representative of the cumulative instruction count up to, and including, that instance of the respective block of code.

Expansion of the control flow path 700 may then continue with the creation of a loop reference vertex R_n1 760 for the loop hitting vertex R. The loop reference vertex R_n1 760 is assigned a cumulative instruction count value that is representative of the cumulative instruction count up to and including that instance of the block of code. More specifically, in order to accurately represent all control flow paths leading to the loop hitting vertex R from the loop hitting vertex K, the loop reference vertex R_n1 760 is assigned a cumulative instruction count value that is greater than or equal to each of the cumulative instruction count values of the set of regression vertices R_xn1 750 and K_xn1 730. So, for example, the loop reference vertex R_n1 760 may be assigned a cumulative instruction count value equal to the largest of the cumulative instruction count values of the set of regression vertices R_xn1 750 and K_xn1 730. A forward regressive edge, illustrated at 755, is created from each of the regression vertices R_xn1 750 to the loop reference vertex R_n1 760. Each of these forward regressive edges 755 represents, in accordance with some example embodiments, setting the instruction counter to the cic number assigned to R_n1 760. In this manner, an instruction count for the execution of the computer program code may be incremented, or otherwise modified, where necessary to a value that is representative of the cumulative instruction count value assigned to the loop reference vertex R_n1 760.

The control flow path 700 may then be further expanded with the creation of a set of return vertices R_xn2, illustrated generally at 770, for each linear control flow path looping back to the loop hitting vertex R, and a set of regression vertices K_xn2 740 for the loop hitting vertex K for each control flow path comprising at least one further instance of the first loop hitting vertex K. Each vertex within the set of return vertices R_xn2 770 comprises a cumulative instruction count value that is representative of the cumulative instruction count up to and including that return instance of the respective block of code. A regressive edge, illustrated at 775 and representing a set of regressive edges, is provided from each return vertex within the set of return vertices R_xn2 770 back to the loop reference vertex R_n1 760.

Similarly, each vertex within the set of regression vertices K_xn2 740 comprises a cumulative instruction count value that is representative of the cumulative instruction count up to and including that instance of the respective block of code. A regressive edge, illustrated at 745, is provided from each return vertex within the set of return vertices K_xn2 740 back to the loop reference vertex K_n0 720. As previously described, such a regressive edge 735, 745 represents, in accordance with some example embodiments, resetting the instruction counter back to the cic value of K_n0 720. In this manner, an instruction count for the execution of the computer program code may be decremented, or otherwise reverted back, from a value that is representative of the return instance of the block of code to a value that is representative of the reference instance of the block of code. In this manner, the instruction count of the looped control flow for the computer program code is bound, thereby enabling the cumulative instruction count values for vertices within the expanded control flow graph following the loop in the computer program code to remain valid.

Expansion of the control flow path 700 may then continue by reverting back to the set of regression vertices R_xn0 712, and with the creation of a loop reference vertex R_n3 722 for the loop hitting vertex R. The expansion of the control flow path 700 may then continue in the same manner as described above for the loop hitting vertex K, as illustrated on the left hand side of the control flow graph 700 of FIG. 7, for the loop hitting vertex R as illustrated on the right hand side of the control flow graph 700. As shown, the same process (albeit with the loop hitting vertices K and R switched) may be performed for expanding the vertices etc. for this case.

Thus, an example of a method of enabling an executed control flow path through computer program code to be determined using instruction count values has been described in which fewer probes may be required to be instrumented within the computer program code in order to record passes through the different parts thereof. Furthermore, by using an expanded control flow graph to model cumulative instruction counts for control flow paths through the computer program code, the semantics of the corresponding conventional control flow graph may be preserved (e.g. the expanded control flow graph contains only the paths within the computer program code that are modelled by the conventional control flow graph). Thus, the use of such an expanded control flow path may enable examples of the present invention to be implemented alongside other known techniques and methods for probe optimization that use conventional control flow graphs.

In some examples, by enabling the number of probes required to be instrumented within computer program code to be reduced, less intrusive code tracing may be achievable, thereby improving run-time analysis for the computer program code, and thereby facilitating the development of proficient computer program code, and thus the development of devices in which such computer program code may be employed. Non-intrusive code tracing is particularly desirable for the development of embedded and real-time applications.

Figure 8:
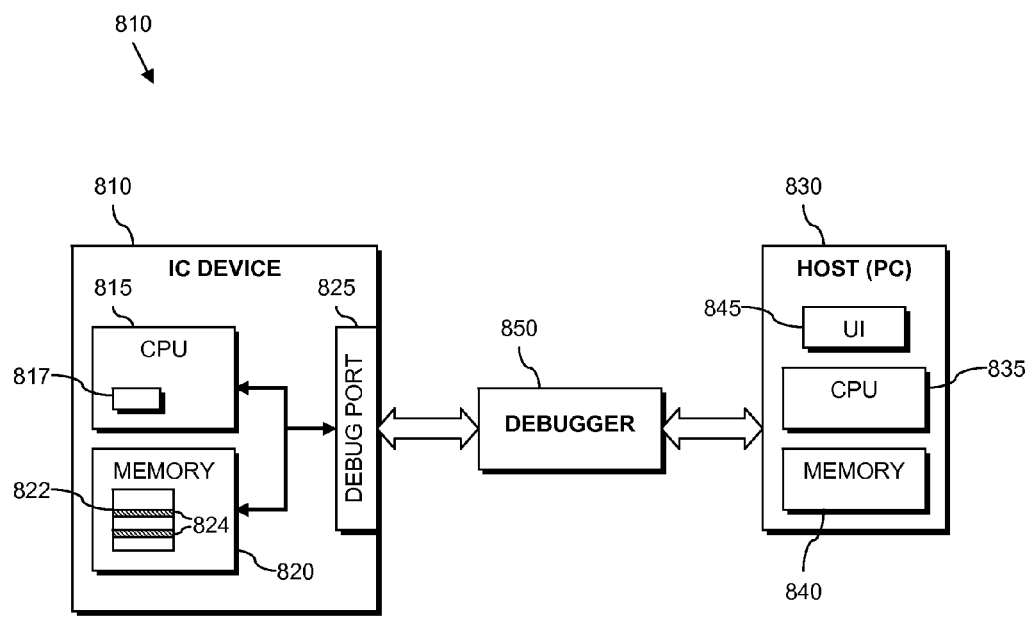
FIG. 8 shows an example of a simplified block diagram of an apparatus for performing run-time analysis of computer program code.

For example, FIG. 8 illustrates an example of a simplified block diagram of an apparatus 800 for performing run-time analysis of computer program code. The apparatus 800 comprises an integrated circuit device 810 arranged to execute computer program code for which run-time analysis is to be performed. The integrated circuit device 810 comprises at least one processing module 815, for example a microprocessor or central processing unit (CPU), arranged to execute computer program code. The integrated circuit device 810 further comprises at least one memory module 820 in which computer program code to be executed and data may be stored and accessed by the at least one processing module 815. The apparatus 800 further comprises a host 830, such as a personal computer (PC) or the like, and which also comprises at least one processing module 835 and at least one memory module 840. The host 830 further comprises a user interface 845, and is arranged to provide various computer program code development and analysis tools, for example by way of applications stored within memory 840 and arranged to be executed by the processing module 835.

In accordance with some examples of the present invention, cumulative instruction counts for control flow paths through computer program code to be analysed are modelled within the host 830, for example by way of an expanded control flow graph as described above. One or more vertices are then instrumented within the computer program code to enable an instruction count for the execution of the computer program code to be accessed. For example, probes may be placed within the source code of the computer program code. The computer program code (with the vertices instrumented therein) may then be compiled, and loaded into the memory 820 of the integrated circuit device 810 for execution. For example, the compiled computer program code may be 'flashed' via a debugger 850 operably coupled to a debug port 825 of the integrated circuit device 810 into the memory 820 thereof, as illustrated generally at 822. Having been loaded into the memory 820 of the integrated circuit device 810, the computer program code 822 may then be executed by the one or more processing module(s) 815 thereof. During execution, the probes instrumented within the computer program code 822, and indicated generally at 824 for illustration purposes, may enable an instruction count for the execution of the computer program code to be accessed. For example, modern instruction processing modules typically comprise instruction counters, such as illustrated at 817 in FIG. 8. Such an instruction counter may comprise, for example, a 16-bit or 32-bit register that is incremented by the processing module 815 during execution. Accordingly, during execution, the probes 824 instrumented within the computer program code 822 may enable the value held within such a register to be accessed, for example by the debugger 850. The probes 824 may further enable decrementing or other means of bounding the instruction counter 817, for example as described above in relation to loops etc. within the computer program code 822, as well as the number of times a loop is executed. In this manner, the instruction count value may be used to determine the control flow path during execution of the computer program code 822 based on the modelled cumulative instruction counts for control flow paths through the computer program code.

For the various examples hereinbefore described, a method of enabling an executed control flow path through computer program code to be determined has been described in which the instruction count during execution of the computer program code has been used to model and trace control flow during execution. In such a manner, such an instruction count may correspond to the number of instructions executed by, for the example illustrated in FIG. 8, the processing module 815. Alternatively, such an instruction count may correspond to the number of processing cycles over which the instructions are executed. It will thus be appreciated that the term 'instruction count' used herein encompasses any such indication of processing progress.

Figure 9:
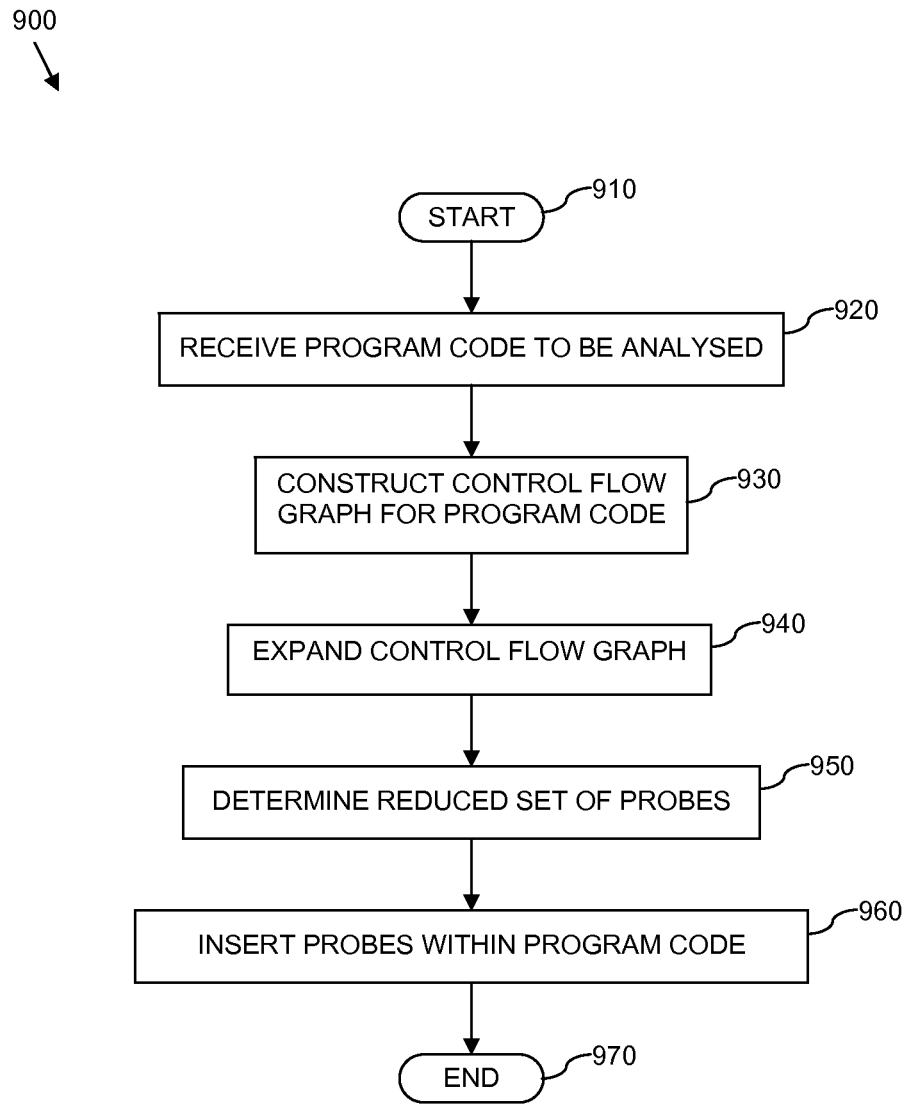
FIG. 9 shows a simplified flowchart of an example of a method of enabling an executed control flow path through computer program code to be determined.

Referring now to FIG. 9, there is illustrated a simplified flowchart 900 of an example of a method of enabling an executed control flow path through computer program code to be determined, such as may be implemented within, say, the host 830 of FIG. 8. The method starts at 910, and moves on to 920 with a receipt of computer program code to be analysed. A conventional control flow graph for the received computer program code is then constructed at 930. The control flow graph is then expanded at 940 to comprise vertices representing individual instances of blocks of code within different control flow paths through the computer program code, and to comprise cumulative instruction count values. A reduced set of probes to insert within the computer program code may be then determined based at least partly on the cumulative instruction count values within the expanded control flow graph at 950. Advantageously, the reduced set of probes may be determined using known techniques and methods for probe optimization using the conventional control flow graph in conjunction with the cumulative instruction count values within the expanded control flow graph. The reduced set of probes may be then inserted within the computer program code at 960, and the method ends at 970.

Figure 10:
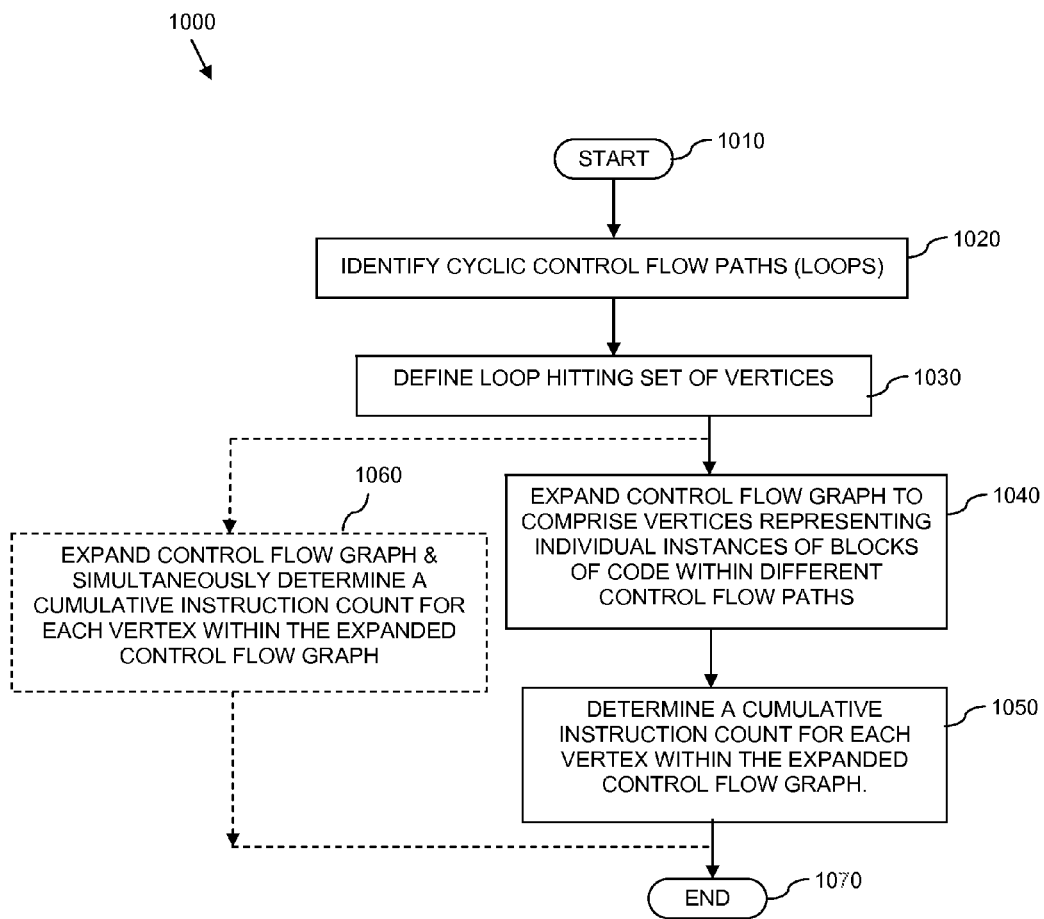
FIG. 10 shows a simplified flowchart of an example of a method of expanding a control flow graph.

FIG. 10 illustrates a simplified flowchart 1000 of an example of a method of expanding a control flow graph, for example as may be implemented within the method of FIG. 9 at 950. The method starts at 1010 and moves on to 1020 where cyclic control flow paths are identified, and a loop hitting set of vertices is defined comprising the loop hitting vertices within the identified cyclic control flow paths at 1030. Next, at 1040, the control flow graph is expanded to comprise vertices that represent individual instances of blocks of code within different control flow paths through the computer program code. A cumulative instruction count is determined for each expanded vertex, as illustrated at 1050. For some examples, the determination of a cumulative instruction count for each expanded vertex may be performed during expansion of the control flow graph. As such, the contents of steps 1040 and 1050 may equally (and optionally) be merged into a single step, as illustrated at 1060. The method then ends at 1070.

Figure 11:
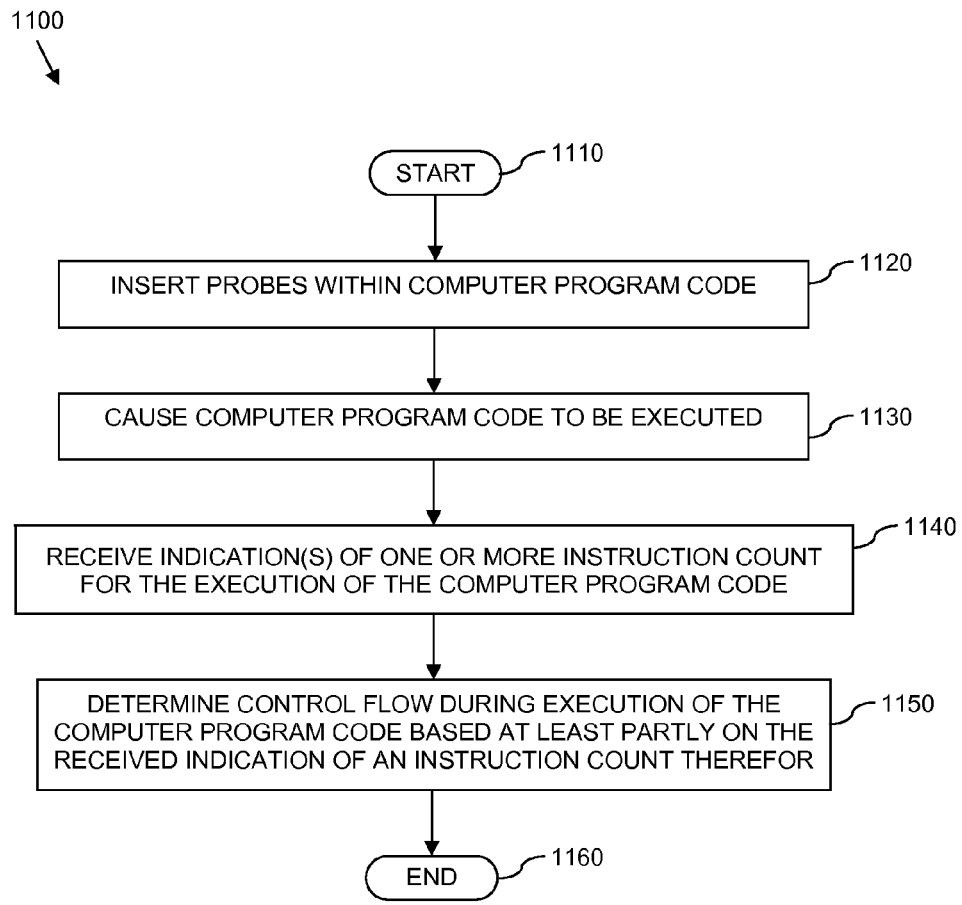
FIG. 11 shows a simplified flowchart of an example of a method of determining control flow during execution of computer program code.

Referring now to FIG. 11, there is illustrated a simplified flowchart 1100 of an example of a method of determining control flow during execution of computer program code, such as may be implemented within host 830 of FIG. 8. The method starts at 1110 and comprises inserting probes within the computer program code at 1120, executing the computer program code within an instruction processing module at 1130, receiving at least one indication of at least one instruction count value for the execution of the computer program code at 1140, and determining the control flow during the execution of the computer program code based at least partly on the received indication of an instruction count value therefor at 1150. For example, an instruction count may be read whenever a probe is executed, and the control flow may be determined based on, say, an instruction count read and a vertex identifier (label) corresponding to the vertex within which the probe was inserted. The method ends at 1160.

Because the illustrated embodiments of the present invention may for the most part, be implemented using electronic components and circuits known to those skilled in the art, details have not be explained in any greater extent than that considered necessary as illustrated above, for the understanding and appreciation of the underlying concepts of the present invention and in order not to obfuscate or distract from the teachings of the present invention.

As will be appreciated by a skilled artisan, the invention may be implemented, as a whole or in part, in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method comprising:
constructing an expanded control flow graph of control flow paths through a computer program code, the expanded control flow graph includes a set of vertices including a first vertex, a second vertex, and a third vertex, wherein the first vertex represents a first instance of a first block of linear code in both a first control flow path and a second control flow path through the computer program code, the second vertex represents a second instance of a second block of linear code in the first control flow path, and the third vertex represents a third instance of the second block of linear code in the second control flow path, wherein the first block of linear code is distinct from the second block of linear code, wherein the first vertex, the second vertex, and the third vertex are distinct from each other;
setting a cumulative instruction count value for the first control flow path to a predetermined number;
incrementing the cumulative instruction count value for the first control flow path by a number of instructions within the first vertex to generate a first cumulative instruction count value for the first vertex;
incrementing the first cumulative instruction count value by a number of instructions within the second vertex to generate a second cumulative instruction count value for the second vertex;
setting a third cumulative instruction count value for the second control flow path to the predetermined number;
incrementing the third cumulative instruction count value for the second control flow path by the number of instructions within the first vertex to generate a fourth cumulative instruction count value for the first vertex;
incrementing the fourth cumulative instruction count value by the number of instructions within the third vertex to generate a fifth cumulative instruction count value for the third vertex; and
inserting at least one probe within the computer program code to enable the first cumulative instruction count value, the second cumulative instruction count value, the fourth cumulative instruction count value, or the fifth cumulative instruction count value to be accessed.

2. The method of claim 1 further comprising accessing the cumulative instruction count value for the at least one control flow path of the computer program code.

3. The method of claim 1 wherein the expanded control flow graph comprising vertices representing individual instances of blocks of code within different control flow paths through the computer program code.

4. The method of claim 3 further comprising determining cumulative instruction count values for the vertices within the expanded control flow graph.

5. The method of claim 1 further comprising determining a reduced set of probes to be inserted within the computer program code.

6. The method of claim 5 wherein the reduced set of probes to be inserted within the computer program code is determined based at least partly on the cumulative instruction count values for the vertices within the expanded control flow graph.

7. The method of claim 3 wherein the method further comprises:
constructing a control flow graph of the computer program code comprising vertices representing blocks of code within the computer program code; and
expanding the control flow graph to comprise vertices representing individual instances of blocks of code within different control flow paths through the program code.

8. The method of claim 7 further comprising identifying at least one loop hitting vertex within the computer program code.

9. The method of claim 8 further comprising expanding the at least one loop hitting vertex to comprise at least one from a group consisting of:
at least one reference vertex;
at least one return vertex; and
at least one regressive edge from the at least one return vertex to the at least one reference vertex.

10. The method of claim 5 further comprising determining a reduced set of probes to be implemented within the computer program code, whereby the reduced set of probes comprises at least one from a group of:
at least one probe within at least one exiting vertex of the computer program code; and
at least one probe within at least one vertex represented by a loop hitting set vertex of the expanded control flow graph.

11. The method of claim 10 wherein the reduced set of probes comprises at least one probe within at least one exiting vertex of the computer program code, and the method further comprises inserting the at least one probe within the at least one exiting vertex of the computer program code, whereby the at least one probe incorporated within the at least one exiting vertex of the computer program code is arranged to read and output an instruction count for the execution of the computer program code.

12. The method of claim 10 wherein the reduced set of probes comprises at least one probe within at least one vertex represented by a loop hitting set vertex of the expanded control flow graph; and the method further comprises incorporating the at least one probe within the at least one vertex represented by a loop hitting set vertex, whereby the at least one probe is arranged to bound an instruction count for the execution of the computer program code.

13. A method of determining control flow during execution of computer program code, the method comprising:
inserting at least one probe within the computer program code in accordance with the method of claim 1;
executing the computer program code within an instruction processing module;
receiving an indication of an instruction count value for the execution of the computer program code; and
determining at least one control flow path during the execution of the computer program code based at least partly on the received indication of an instruction count value therefor.

14. The method of claim 1 wherein the cumulative instruction count value is a sum of instructions within the computer program code up to and including a vertex.

15. A method comprising:
constructing a first control flow graph of the computer program code, wherein the first control flow graph has a first number of vertices representing blocks of linear code, wherein a first vertex represents a first block of linear code and a second vertex represents a second block of linear code, wherein the first block of linear code is distinct from the second block of linear code;
expanding the first control flow graph to create an expanded control flow diagram to provide a second number of vertices to represent individual instances of the blocks of linear code, wherein the second number of vertices is greater than the first number of vertices, and wherein the second number of vertices includes the first vertex, the second vertex, and a third vertex, wherein the first vertex represents a first instance of a first block of linear code in both a first control flow path and a second control flow path through the computer program code, the second vertex represents a second instance of a second block of linear code in the first control flow path, and the third vertex represents a third instance of the second block of linear code in the second control flow path, wherein the first vertex, the second vertex, and the third vertex are distinct from each other;
setting a cumulative instruction count value for the first control flow path to a predetermined number;
incrementing the cumulative instruction count value for the first control flow path by a number of instructions within the first vertex to generate a first cumulative instruction count value for the first vertex;
incrementing the first cumulative instruction count value by a number of instructions within the second vertex to generate a second cumulative instruction count value for the second vertex;
setting a third cumulative instruction count value for the second control flow path to the predetermined number;
incrementing the third cumulative instruction count value for the second control flow path by the number of instructions within the first vertex to generate a fourth cumulative instruction count value for the first vertex;
incrementing the fourth cumulative instruction count value by the number of instructions within the third vertex to generate a fifth cumulative instruction count value for the third vertex; and
determining a cumulative instruction count value for each vertex in the expanded control flow graph, wherein the cumulative instruction count value is a sum of instructions within the computer program code up to and including a vertex.

16. The method of claim 15 further comprising:
inserting at least one probe within the first vertex in the computer program code to enable a cumulative instruction count value for a control flow path at the first vertex to be accessed.

17. The method of claim 15 wherein the first vertex is a last in execution order vertex in the computer program code.

18. The method of claim 15 further comprising:
setting a cumulative instruction count value for a second control flow path through the computer program code to the predetermined value;
incrementing the cumulative instruction count value for the second control flow path by a number of instructions within the third vertex of the second control path to generate a third cumulative instruction count value for the third vertex;
incrementing the third cumulative instruction count value by a number of instructions within the fourth vertex of the second control path to generate a fourth cumulative instruction count value for the fourth vertex;

incrementing the fourth cumulative instruction count value by a number of instructions within a fifth vertex of the second control path to generate a fifth cumulative instruction count value for the fifth vertex, wherein the second vertex and the fifth vertex are different instances of a same vertex of the computer program code; and inserting a probe within the fifth vertex to enable the fifth cumulative instruction count value for the second control flow path to be accessed.

19. A method comprising:

setting a cumulative instruction count value for a first control flow path through the computer program code to a predetermined value;

incrementing the cumulative instruction count value for the first control flow path by a number of instructions within a first vertex of the first control path to generate a first cumulative instruction count value for the first vertex, wherein the first vertex represents a first instance of a first block of linear code in the computer program code;

incrementing the first cumulative instruction count value by a number of instructions within a second vertex of the first control path to generate a second cumulative instruction count value for the second vertex, wherein the second vertex represents a second instance of a second block of linear code in the first control flow path, wherein the first block of linear code is distinct from the second block of linear code;

setting a third cumulative instruction count value for a second control flow path through the computer program code to the predetermined value;

incrementing the third cumulative instruction count value for the second control flow path by the number of instructions within the first vertex of the second control path to generate a fourth cumulative instruction count value for the first vertex, wherein the first vertex represents the first instance of the first block of linear code in the computer program code;

incrementing the fourth cumulative instruction count value by a number of instructions within a third vertex of the second control path to generate a fifth cumulative instruction count value for the third vertex, wherein the third vertex represents a third instance of the second block of linear code in the second control path of the computer program code, wherein the first vertex, the second vertex, and the third vertex are distinct from each other; and inserting a probe within the second vertex to enable the second cumulative instruction count value for the first control flow path to be accessed.

20. The method of claim 19 further comprising:

constructing a control flow graph of the computer program code comprising vertices representing blocks of code within the computer program code; and expanding the control flow graph to comprise vertices representing individual instances of blocks of code within different control flow paths through the program code.

* * * * *